(12) United States Patent
Bigler

(10) Patent No.: US 7,621,114 B1
(45) Date of Patent: Nov. 24, 2009

(54) REINFORCED BELT HAVING REDUCED ELECTRICAL RESISTIVITY AND METHOD FOR PRODUCING SAME

(75) Inventor: Jeremy M. Bigler, Landisville, PA (US)

(73) Assignee: Fenner U.S., Inc., Manheim, PA (US)

( * ) Notice: Subject to any disclaimer, the term of this patent is extended or adjusted under 35 U.S.C. 154(b) by 0 days.

(21) Appl. No.: 12/174,786

(22) Filed: Jul. 17, 2008

(51) Int. Cl.
B65G 15/34 (2006.01)
F16G 1/10 (2006.01)

(52) U.S. Cl. .................. 59/84; 59/85; 59/90; 474/260; 474/266; 198/844.1; 198/850; 198/853; 156/137; 156/266; 156/292

(58) Field of Classification Search .................. 157/137, 157/266, 292; 198/844.1, 49, 850, 853; 474/260, 474/266; 59/84, 85, 90, 91
See application file for complete search history.

(56) References Cited

U.S. PATENT DOCUMENTS

| | | |
|---|---|---|
| 72,181 A | 12/1867 | Fountain |
| 1,177,664 A | 4/1916 | Vuilleumier |
| 1,182,933 A | 5/1916 | Schulte |
| 1,438,566 A | 12/1922 | Wiggins |
| 1,519,165 A | 12/1924 | Pilliner |
| 2,811,468 A | 10/1957 | Joffre |
| 2,829,070 A | 4/1958 | Osborn |
| 2,969,686 A | 1/1961 | Runton |
| 3,154,960 A | 11/1964 | Creswell |
| 3,154,961 A | 11/1964 | Creswell |
| 3,269,523 A | 8/1966 | Creswell |
| 3,288,273 A | 11/1966 | Michaelson et al. |
| 3,345,113 A | 10/1967 | Siber |
| 3,387,500 A | 6/1968 | Hutzenlaub et al. |
| 3,418,862 A | 12/1968 | Hurbis |
| 3,740,256 A | 6/1973 | Manion et al |

(Continued)

FOREIGN PATENT DOCUMENTS

JP  59-97345  6/1984

(Continued)

*Primary Examiner*—David B Jones
(74) *Attorney, Agent, or Firm*—Stephen H. Eland; Dann, Dorfman, Herrell & Skillman

(57) ABSTRACT

A link belt for use as a conveyor belt or power transmission belt is provided. The belt is formed of a plurality of links forming a series in successive overlapping relation. The upper surface of each belt link includes an electrically conductive layer. Additionally, the lower surface of each belt link may have an electrically conductive layer. The conductive layer or layers provide an electrical path along the belt to impede the build-up of static electricity as the belt is run during use. Further a method for producing the conveyor is provided. A plurality of layers of reinforcing material is arranged in overlapping relation. A binding material such as a thermoset urethane is deposited on the composite material, forming a conductive layer. The combined conductive layer and composite material are cured so that the conductive layer permanently bonds to the composite material. The combined conductive layer and composite material are then cut into a plurality of belt links, such that the conductive layer of each belt link is generally coextensive with the upper surface of the belt link. The belt links are then assembled to produce a link belt having an electrically conductive path.

29 Claims, 3 Drawing Sheets

U.S. PATENT DOCUMENTS

| | | | |
|---|---|---|---|
| 3,857,478 A | 12/1974 | Meeusen | |
| 3,940,520 A | 2/1976 | Dixon et al. | |
| 3,988,491 A | 10/1976 | Dixon et al. | |
| 3,991,632 A * | 11/1976 | Stephens | 474/241 |
| 4,009,304 A | 2/1977 | Dixon et al. | |
| 4,015,038 A | 3/1977 | Romanski et al. | |
| 4,020,223 A | 4/1977 | Dixon et al. | |
| 4,028,956 A | 6/1977 | Thompson | |
| 4,055,265 A | 10/1977 | Eiserman | |
| 4,256,249 A | 3/1981 | Konno et al. | |
| 4,377,365 A | 3/1983 | Layh | |
| 4,458,809 A | 7/1984 | White et al. | |
| 4,550,823 A | 11/1985 | Gladish | |
| 4,588,073 A | 5/1986 | Abell | |
| 4,606,955 A | 8/1986 | Eastman et al. | |
| 4,675,229 A | 6/1987 | Westhead | |
| 4,688,615 A | 8/1987 | Lee | |
| 4,758,213 A * | 7/1988 | Tanaka et al. | 474/264 |
| 4,764,405 A | 8/1988 | Bauman et al. | |
| 4,767,389 A * | 8/1988 | Habegger et al. | 474/266 |
| 4,771,110 A | 9/1988 | Bauman et al. | |
| 4,800,053 A | 1/1989 | Bauman et al. | |
| 4,823,942 A | 4/1989 | Martin et al. | |
| 4,833,205 A | 5/1989 | Bauman et al. | |
| 4,861,323 A | 8/1989 | Kobayashi et al. | |
| 4,880,879 A | 11/1989 | Bauman | |
| 4,883,448 A | 11/1989 | Kobayashi et al. | |
| 4,903,824 A | 2/1990 | Takahashi | |
| 4,922,304 A | 5/1990 | Gilbert et al. | |
| 4,925,013 A | 5/1990 | Lapeyre | |
| 4,957,199 A | 9/1990 | Wokke et al. | |
| 4,972,030 A | 11/1990 | Bauman | |
| 5,011,003 A | 4/1991 | Gladding | |
| 5,176,246 A | 1/1993 | Wiggers et al. | |
| 5,332,786 A | 7/1994 | Nagata et al. | |
| 5,361,893 A | 11/1994 | Lapeyre et al. | |
| 5,382,635 A | 1/1995 | McInnis et al. | |
| 5,417,619 A * | 5/1995 | Tajima et al. | 474/260 |
| 5,506,283 A | 4/1996 | McInnis et al. | |
| 5,507,383 A | 4/1996 | Lapyere et al. | |
| 5,564,558 A * | 10/1996 | Hampton et al. | 198/850 |
| 5,582,287 A | 12/1996 | Heit et al. | |
| 5,658,634 A | 8/1997 | Ragland et al. | |
| 5,667,058 A | 9/1997 | Bonnet | |
| 5,693,714 A | 12/1997 | Bauman et al. | |
| 5,853,849 A | 12/1998 | Nishio et al. | |
| 5,969,053 A | 10/1999 | Bauman et al. | |
| 5,984,082 A | 11/1999 | Geib | |
| 6,062,379 A * | 5/2000 | Geib et al. | 198/844.1 |
| 6,173,831 B1 | 1/2001 | Grabscheid et al. | |
| 6,441,128 B1 | 8/2002 | Bauman et al. | |
| 6,565,689 B2 * | 5/2003 | Geib et al. | 156/137 |
| 6,770,004 B1 * | 8/2004 | Lofgren et al. | 474/266 |
| 7,004,311 B2 * | 2/2006 | Fatato et al. | 198/849 |
| 7,241,354 B2 * | 7/2007 | Fatato et al. | 156/266 |
| 7,449,079 B2 * | 11/2008 | Fatato et al. | 156/266 |

FOREIGN PATENT DOCUMENTS

| | | |
|---|---|---|
| JP | 04-269526 | 9/1992 |
| JP | 06-300085 | 10/1994 |
| JP | 10-063029 | 3/1998 |
| JP | 2004-131880 | 4/2004 |

* cited by examiner

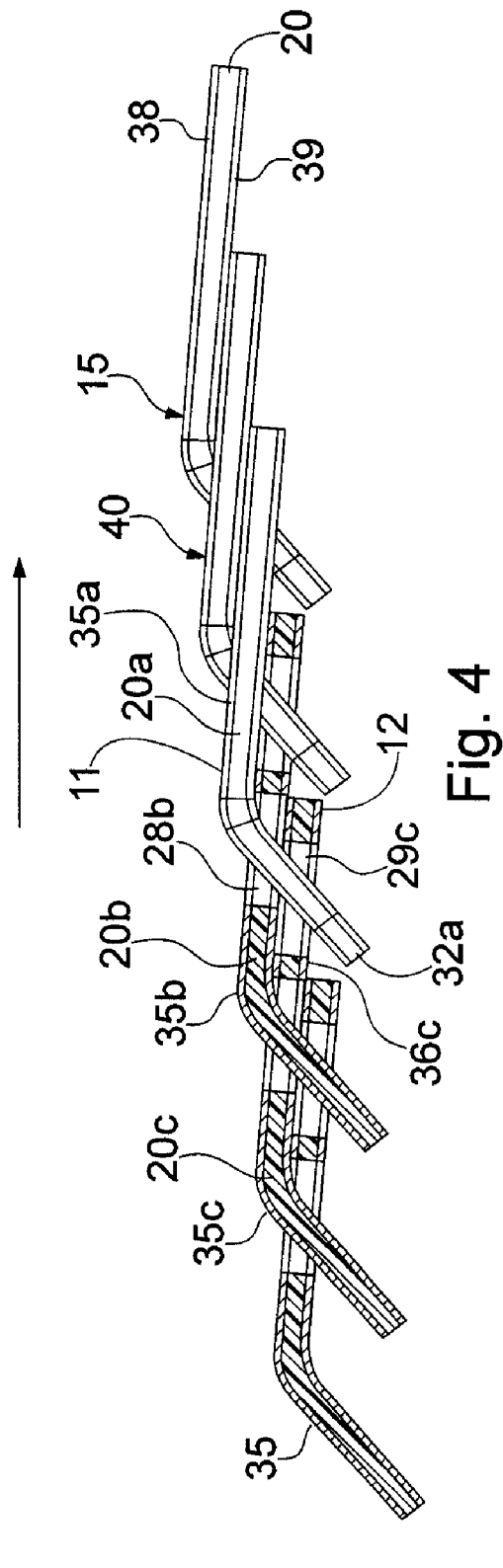
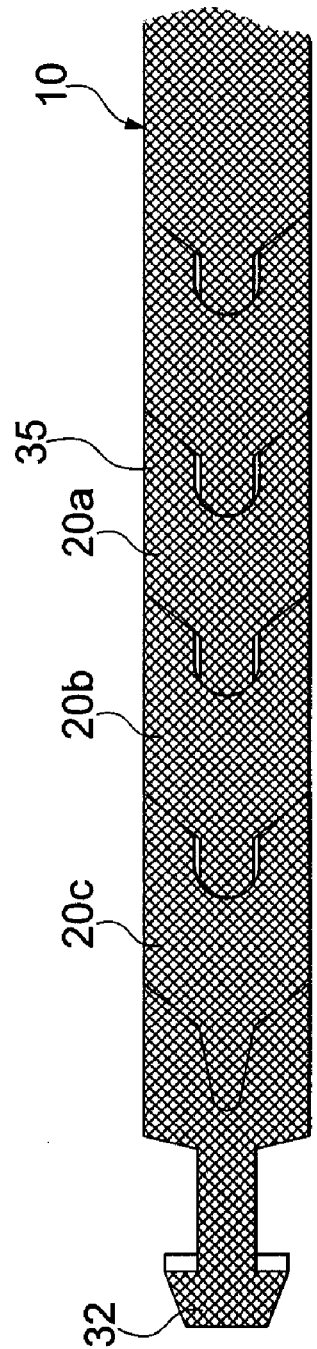

REINFORCED BELT HAVING REDUCED ELECTRICAL RESISTIVITY AND METHOD FOR PRODUCING SAME

FIELD OF THE INVENTION

The present invention relates to interlocking-link conveyor or power transmission belts and has particular use in applications in which the belt is used in an environment in which a static charge on the belt is undesirable.

BACKGROUND OF THE INVENTION

Link belts are generally known and used in a variety of applications, such as power transmission belts and conveyor belts. One well known belt is formed of a plurality of layers of reinforced polymer material. Although the belts have been successfully used in a variety of applications and environments, the known belts have not been acceptable in environments in which it is critical to prevent static discharge from the belt. In the past, several belts have been proposed for preventing the static build up on belts, however, none of the belts have been able to provide the performance characteristics needed for power transmission and/or conveyor applications. Accordingly, there has been a need for a high strength link belt that is operable in applications that require a belt that will not build up a significant charge.

SUMMARY OF THE INVENTION

In light of the long-felt need for a useable conveyor or power transmission belt having a reduced tendency to build-up static, the present invention provides a belt having an electrically conductive layer.

According to one aspect, the present invention provides a link belt formed of a plurality of overlapping interconnected links. Each link comprises a connector for connecting the link with an adjacent link. Each link is formed of a matrix material, a reinforcement layer and a conductive layer. The reinforcement layer is embedded within the matrix material and has a higher modulus of elasticity than the matrix material. The conductive layer is formed at an outer layer of the matrix material and has a resistivity that is substantially less than the resistivity of the matrix material. Additionally, the conductive layer may be formed of a sheet of metal fibers.

According to another aspect, the present invention provides a link belt formed of a plurality of links. Each link has an upper conductive layer, a lower conductive layer and a matrix material between the conductive layers. A reinforcement layer is embedded in the matrix material to provide tensile strength for the links. When the links are connected, contact points between the conductive layers of adjacent links provide an electrically conductive path along the length of the belt to impede the build-up of static charge on the belt.

According to another aspect, the present invention provides a method for producing a link belt having a reduced tendency to a build-up static charge. The method includes the steps of providing a binding material and reinforcing the binding material with a reinforcement layer. A sheet of conductive material is applied to the top layer of the binding material before the binding material is cured. The binding material, reinforcement layer and conductive layers are then cured together to create belt material, which is cut into a plurality of belt links. The links are connected to form a series of successive overlapping links by mechanically interlocking and overlapping successive links in such a manner that a plurality of electrically conductive points from a link are in electrically conductive relationship with an adjacent link.

BRIEF DESCRIPTION OF THE DRAWINGS

The foregoing summary and the following detailed description of the preferred embodiments of the present invention will be best understood when read in conjunction with the appended drawings, in which:

FIG. 4 is a fragmentary side view partially in section, of the belt shown in FIG. 1.

FIG. 5 is a plan view of the belt shown in FIG. 4.

DETAILED DESCRIPTION OF THE INVENTION

Figure 1:
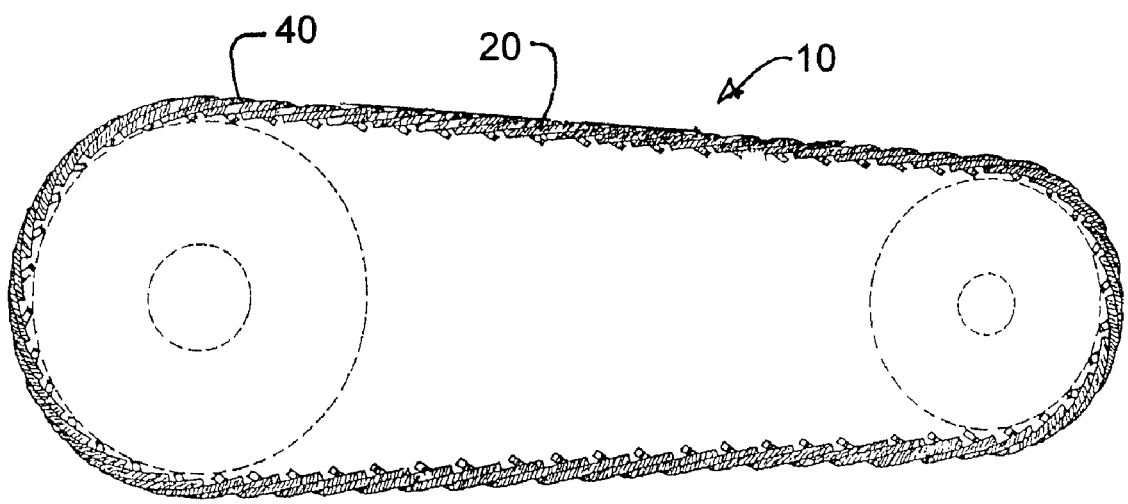
FIG. 1 is a side view of an link belt assembly having reduced electrical resistivity shown engaged by a driving mechanism for the assembly.

Referring now to the drawings in general and FIG. 1 specifically, a belt having an electrically conductive path 40 is designated generally 10. The belt 10 is shown entrained about two pulleys. The electrically conductive path 40 impedes the build-up of a static charge on the belt. Although the belt is illustrated as a conveyor belt, the belt 10 could be a transmission belt for transmitting power from a drive element to a driven element, such as transmitting power from a drive pulley to a driven pulley. In a preferred embodiment, the belt 10 is a link belt formed of a plurality of links each having a surface that forms the electrically conductive path 40.

Figure 2:
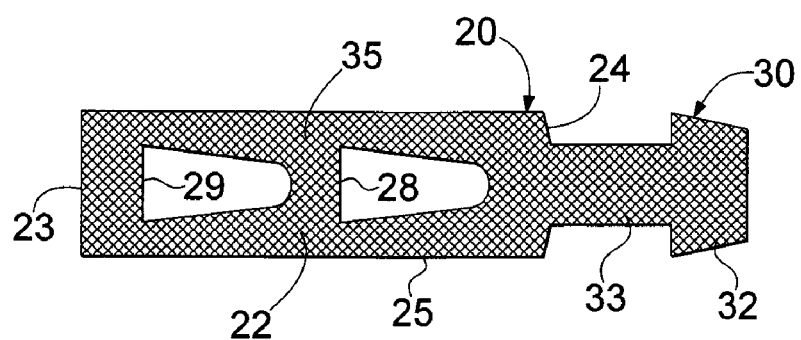
FIG. 2 is a top view of an individual link of the belt shown in FIG. 1 prior to assembly.
Figure 3:
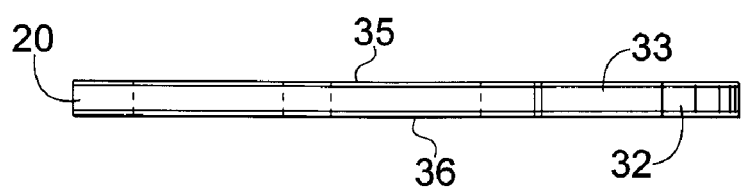
FIG. 3 is a side view of the individual belt link shown in FIG. 2.

Referring now to FIGS. 4 and 5, the belt 10 preferably comprises a series of interlocking belt links 20. One of the individual links 20 that comprise belt 10 is illustrated in FIGS. 2 and 3. Each belt link 20 has a body portion 22 and a fastener 30 connected to the body portion. In the present instance, the thickness of the belt link 20 between the top surface and the bottom surface is substantially uniform throughout the entire link.

An electrically conductive layer is permanently bonded to one of the outer surfaces of each belt link. The conductive layer may be either the top layer of the belt link or the bottom layer. In the present instance, each link includes both a top conductive layer 35 and a bottom conductive layer 36. Additionally, in the present instance, the conductive layers are coextensive with the top/bottom surfaces of the belt link 20. When the belt links 20 are assembled to form a belt 10, the conductive layers 35,36 on adjacent links contact one another to form electrically conductive paths, as discussed further below.

The body portion 22 of the belt link 20 is generally rectangular, having two edges 25 extending longitudinally between a leading end 23 and a trailing end 24, both of which extend transversely between the two edges. Adjacent leading end 23 a leading aperture 29 extends through the thickness of body portion 22. Longitudinally spaced from the leading aperture 29, adjacent the trailing end 24, a trailing aperture 28 extends through the thickness of body portion 22.

The leading end 23 corresponds to the direction in which the assembly 10 travels as shown by the arrow in FIG. 4. However, the direction in which the assembly 10 travels can be reversed so that the leading end 23 does not lead the trailing end 24 with respect to the actual travel of the assembly.

The fastener 30 integrally connects the body portion 22, and comprises a fastening tab 32 and a constricted neck 33. The neck extends longitudinally, with one end connected to the fastening tab 32, and the other end connected to the trailing end 24 of body 22. The length of the neck 33 between the trailing end 24 and the fastening tab 32 is sufficiently long to allow the fastening tab 32 to extend through the apertures in two belt links 20 as will be further discussed below.

The fastening tab 32 is generally trapezoidal shaped, having two parallel ends that are transverse the neck 33. The fastening tab 32 is substantially wider than the neck 33, being widest at the point where it intersects the neck, and tapering as it extends away from the neck.

The belt links 20 are connected by passing the link fasteners through the apertures in adjacent belt links. To ensure that the belt links can properly connect, the apertures are configured and dimensioned with reference to the fastening tab and the neck.

In the present instance, the apertures through body 22 are non-circular. Both apertures 28 and 29 are longitudinally elongated so that their length is greater than their width. To ensure that fastening tab 32 can pass through the apertures, the length of the apertures is greater than the greatest width of the fastening tab 32.

The width of apertures 28 and 29 is not constant. Instead, the apertures widen as they extend toward leading end 23. To provide proper connection between the belt links 20, the apertures are narrower than the fastening tab width so that the fastening tab 32 cannot pass back through the apertures once the belt links are connected. However, the apertures are wider than the neck 33 to allow the neck to extend through the apertures while the belt links are connected, as will be discussed below.

The belt links 20 are made of a material of sufficient tensile strength to convey the weight of the workpiece or transmit the necessary power, if used in a power transmission application. In the preferred embodiment, the belt links 20 are made of a thermoset urethane that is reinforced with a polyester fabric.

Because the belt links have sufficient tensile strength to convey the weight of the workpiece, the material used to make the conductive layer 35 can be chosen according to characteristics such as resistivity and flexibility, without significant regard to its tensile strength. A variety of conductive elements can be used to form the conductive layer, such as metal, carbon, carbon fiber or highly conductive polymers. In the present instance, the conductive layer is a layer of conductive material, such as a metal material, and as shown in FIGS. 2 and 5, the conductive layers is a mesh, such as a mesh of metallic fibers. More specifically, in the present instance, the conductive layer is a layer of fabric that is coated with metal.

As stated above, the electrically conductive layer may be along the top or bottom surfaces of the links, and in the present instance are at the top and bottom surfaces. It should however be understand that the conductive layer being at the top or bottom surface does not mean that conductive material is necessarily an exposed surface at the top or bottom surface of the link. During the manufacturing process, some material may coat the conductive material. For instance, a thin layer of binder material may coat the conductive material. This is particularly true for materials such as a mesh or a fabric in which the binder is likely to squeeze through the mesh. However, in the present instance, the conductive materials are substantially close to the outer surface of the top and bottom surfaces so that the layer of material coating the conductive material is less than the thickness of the conductive material.

It should be noted that the thickness of each conductive layer is exaggerated in the Figures for illustrative purposes. In actuality, the thickness of each conductive layer is minimal compared to the overall thickness of the belt links. For instance, the thickness of each link is approximately 0.200 and each conductive layer is less than 0.050". Specifically, the conductive material is between 0.005" and 0.025" thick, and in the present instance, the conductive material is 0.015" thick.

As previously stated, the interlocking-link belt 10 has a conductive layer 40, and is comprised of a plurality of belt links 20 that have been described above. The following discussion describes the interconnections between the belt links 20 that form the belt 10.

As shown in FIGS. 4 and 5, a series of belt links 20 are arranged in a superimposed successive overlapping relation to form the belt 10 with a conductive layer 40. The bottom of each belt link overlaps the top of an adjoining belt link, so that the thickness of the belt 10 is at least twice the thickness of an individual belt link 20.

FIG. 4 illustrates a portion of the assembly 10, showing how the conductive layers interact to form a conductive path when the belt links are interconnected. Included in these views is the connection between a belt link 20A, and the two succeeding belt links, 20B, and 20C. In this connection, the fastening tab 32A of belt link 20A passes sideways through apertures in the two succeeding belt links. It first passes through the trailing aperture 28B of the adjacent succeeding belt link 20B and then passes through the leading aperture 29C of the next succeeding belt link 20C.

The term trailing is used with respect to the direction the assembly travels, as shown in by the arrow in FIG. 4. Because the direction of travel can be reversed, the preceding belt links can be succeeding with respect to the actual travel of the assembly 10.

After passing through the aperture in belt link 20C, the belt link fastening tab 32A is twisted to bear against the bottom surface 36C of belt link 20C. When connected in this way, the top surface 35A of belt link 20A is the top side 11 of belt 10, and the bottom surface 36C of belt link 20C is the bottom side 12 of belt 10.

The configuration of the links and how they are connected provides a plurality of electrically conductive paths between the belt links. For instance, From FIGS. 2 and 3 it can be seen that the electrically conductive layers extend to the edges of the belt link 20. Additionally, the electrically conductive layers extend to the edges of the fastener 30 including the locking tab 32. As shown in FIG. 4, the fastener 30 bears against the bottom surface of one of the preceding links, and the bottom surface of a link contacts the upper conductive layer of the preceding link. Additionally, the neck 33 may contact one of the conductive layers 35, 36 of either of the links that the neck passes through. These numerous points of contact provide numerous potential electrically conductive paths.

Although the link belt can be formed so that each link only overlaps a single preceding belt, as discussed above, in the present embodiment each link overlaps two adjacent links, as shown in FIG. 4. Therefore, each link is potentially in electrically conductive contact with two adjacent links, thereby providing parallel electrical paths between adjacent links.

For instance, referring to FIGS. 4 & 5, link 20*a* overlaps links 20*b* and 20*c*. Therefore, the neck 33 of link 20*a* passes through the trailing aperture 28*b* of link 20*b* and the leading aperture 29*c* of link 20*c*. As discussed previously, the conductive layers 35, 36 extend to the edge of the links. Therefore, the edges of the apertures 28, 29 have electrically conductive points that can contact electrically conductive points along the edge of the neck 33*c*. In this way, the conductive layers 35*a*, 36*a* of link 20*a* are connected with the conductive layers 35b, 35c and 36b, 36c of links 20b and 20c via the neck 33a of link 20a. Similarly, link 20b is connected with link 20c and the next trailing link via the exposed edges of the connector 30 and the neck 33. In this way, the overlapping links also provide a plurality of overlapping parallel pathways between the conductive layers of adjacent links. Therefore, if one or more of the conductive paths is interrupted between two links at one point, one of the alternate parallel connections may provide the electrical pathway between the adjacent links to maintain a conductive path along the length of the belt.

Additionally, the belt may include more than two overlapping links, which would provide even more parallel paths to maintain the conductive path. Specifically, as described above, each link overlaps two adjacent links. However, in certain applications it is desirable to configure the belt so that each belt link overlaps three or more adjacent links. In such an embodiment, the links includes further apertures and the connector for each link goes through three or more adjacent links. In this way, each connector provides a parallel path electrically connecting a link with three adjacent links.

Figure 6:
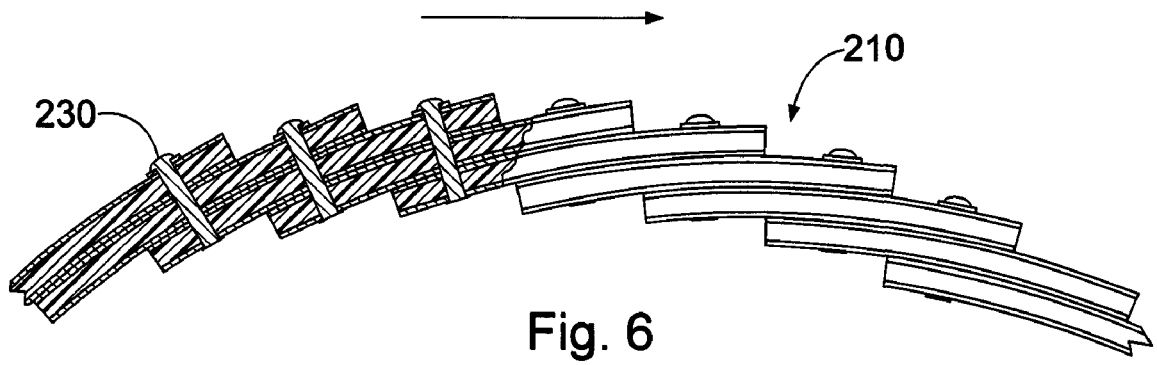
FIG. 6 is a fragmentary side view partially in section, of an alternate belt.

In the foregoing description, the embodiment of the belt 10 is described as being formed of links 20, each of which has a connector 30 that is integrally formed with the body of the link. However, the link belt 10 may be formed of links that utilize a separate connector. For instance, the connector may be a rivet that connects the adjacent links, such as shown in FIG. 6. Alternatively, the connector may be a fastening stud having an elongated head that passes through apertures in each belt link. Such fastening studs have enlarged heads that bear against the lower surface of the links similar to the manner in which the connecting tabs 32 bear against the bottom surface of the links as described above.

It should also be understood that the configuration of the apertures may vary when using an alternative connector. For instance, when using rivets it is desirable to use a more rounded hole, rather than the elongated apertures 28, 29 described above. On the other hand, when using studs, the aperture may be more elongated or slot-like.

One of the advantages of using a separate connector is that such connectors are frequently formed of a conductive material such as steel. Therefore, the separate connectors may provide an improved electrical connection between the conductive layers on adjacent layers. Additionally, the connectors may be formed of a material that resists sparking, such as brass or aluminum.

The belt 10 is produced as follows. The belt links 20 that make up the belt 10 include at least one layer of reinforcing material, such as woven polyester sheet. The reinforcing material is impregnated with a binding material to form a composite material. The binding material is liquified and deposited onto the reinforcing material while liquid. Preferably, the composite material includes a plurality of layers of reinforcing material and the binding material is a thermoset urethane.

The conductive layers 35, 36 are laid on the composite material, preferably while the binding material is wet. In other words, preferably the conductive layers are laid onto the composite material before the composite material is cured or dried. The conductive material may be sprayed on or poured on, or the composite material may be partially submerged in a bath of conductive material. However, preferably the conductive layers are sheets of electrically conductive material that are laid onto the binder and reinforcement layers. For instance, in the present instance, the electrically conductive materials are metallized fabric materials that are approximately coextensive with the upper/lower surface of the reinforcement material. One material that provides a desirable resistivity is a non-woven point bonded polymer fabric that is coated with a metallic material, such as a nickel silver alloy. Since the binding material of the composite material is wet when the conductive sheets are placed onto the composite material, the conductive sheets adhere to the binder with the reinforcement layers.

After the conductive sheets are laid together with the binder and reinforcement material, the combination is the pressed together under high pressure. After the layers are pressed together, the combination is cured. During the curing process the conductive layers 35, 36 permanently bond to the composite material.

Ordinarily the cured material is at least several times wider that the width of the belt links 20. The cured material is therefore cut into a plurality of elongated strips approximately as wide as the width of a belt link 20. The belt links are then cut-out from the strips of cured material. In the present instance, the belt links are formed by punching, which also simultaneously punches the rearward and forward apertures in the belt links.

Formed in this way, the belt links 20 have two integral conductive layers forming the top and bottom surfaces 35, 36 of the belt link. The conductive layers are coextensive with the substrate material forming the belt link 20 which in the present instance is polyester reinforced thermoset urethane.

The belt links 20 are assembled to form a continuous interlocking link belt 10. The belt links 20 are connected to one another as detailed above and shown in FIGS. 4 and 5.

In the foregoing example, the belt links have been formed with the conductive layers positioned at the top or bottom surface of the belt links. In an alternative embodiment, the conductive layer or layers may be positioned within the matrix. For example, in an alternative embodiment, a layer of conductive material may be embedded within the middle of the belt links. In such an embodiment, the matrix material will insulate the conductive layer from providing an electrically conductive path with the at the upper or lower surfaces of the belt links. However, as discussed previously, the conductive layer extends to the edges of the links. Accordingly, the conductive layer forms a series of exposed electrically conductive points at the edges of the links. When the links are interconnected, the exposed electrically conductive points of adjacent links provide paths between the links.

For instance, when the conductive layer is disposed within the center of the matrix, the conductive layer is exposed at the edges of the connector 30. Therefore, the conductive layer is exposed to the surface along the edges of the connector neck 33. Similarly, conductive layers is also exposed at the interior edges of the apertures 28, 29. When the links are combined to form a belt, the neck 33 of the connector 30 passes through the apertures 28, 29 of two links, as shown in FIGS. 4-5 for the embodiment discussed above. Accordingly, the edges of the neck 33 contact the interior edges of the apertures 28, 29. In this way, the exposed edge of the conductive layer along the neck provides one or more points for providing an electrically conductive path with the conductive layer of two adjacent links.

Although the electrical pathway between the links may have a higher resistance when the conductive layer is embedded within the links, the electrical pathway may still be sufficiently low to impede the accumulation of a static charge on the belt during operation. Additionally, since each link is connected with two adjacent links, the conductive layers are connected to one another in parallel connections. Therefore, if the connection between the neck of one link and the aperture of an adjacent link to not make sufficient contact to provide an electrically conductive pathway, one of the parallel connections may provide the electrically conductive pathway between the links.

In yet another embodiment, the reinforcement layer may be integrated into the conductive layer. For instance, as described above, the conductive layer may be a layer of fabric, such as a non-woven fabric. The fabric is then coated with an electrically conductive material, such as metal. Therefore, the fabric may selected so that it has a sufficient tensile strength to withstand the load requirement of the belt. The reinforcing fabric can then be coated with an electrically conductive material, such as metal. The reinforcing fabric and layer of metal are then embedded within the matrix material to reinforce the link. The electrically conductive path between adjacent links would be similar to the embodiment described above in which the conductive layer is embedded within the link. Depending on the tensile strength requirement of the belt, additional reinforcement layers may also be embedded within the belt. The additional reinforcement layers may or may not include a conductive layer, depending on the operational requirements and cost constraints.

Although in the preferred embodiment, the belt is a link belt, the present invention is broad enough to include other types of belts, such as endless belts (i.e. belts made of a single length of material with the ends spliced together to form the belt). In the situation of an endless belt, the belt material can be formed as described above and then cut into lengths of belt of the appropriate length and width. The ends are then joined using any of a variety of known joints for splicing together a belt, such as a splice joint that is mechanically fastened or bonded with an adhesive. The edges of the assembled belt are then trimmed.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A link belt, comprising:
   a plurality of overlapping interconnected links, wherein each link comprises:
   a connector for connecting the link with an adjacent link;
   a matrix material having a modulus of elasticity and a conductivity;
   a reinforcement layer embedded within the matrix material having a higher modulus of elasticity than the matrix material; and
   a conductive layer formed at an outer layer of the matrix material, wherein the conductive layer has a resistivity that is substantially less than the resistivity of the matrix material, and wherein the conductive layer is formed of a sheet of metal fibers comprising a non-metallic substrate with a metallic outer layer.

2. The link belt of claim 1 wherein the conductive layer is less than approximately 0.050" thick.

3. The link belt of claim 1 wherein the conductive layer is between approximately 0.005" and 0.025" thick.

4. The link belt of claim 1 wherein the conductive layer comprises a plurality of conductive contacts points to provide an electrically conductive path along a plurality of points between adjacent links.

5. The link belt of claim 4 wherein the plurality of points create an electrically conductive path along the length of the belt.

6. The link belt of claim 4 wherein the surface resistivity between an outer surface of adjacent belt links is less than approximately 10,000 ohms per square.

7. The link belt of claim 6 wherein the surface resistivity between an outer surface of adjacent belt links is less than approximately 1,000 ohms per square.

8. The link belt of claim 6 the surface resistivity of the upper and lower surfaces of the belts links is less than approximately 10,000 ohms per square.

9. The link belt of claim 1 wherein the connector for a link provides an electrically conductive path between the link and a link to which the connector is connected.

10. A link belt, comprising:
    a plurality of overlapping interconnected links, wherein each link comprises:
    an upper conductive layer;
    a lower conductive layers;
    a matrix material between the upper and lower conductive layers, wherein the matrix material has a resistivity that is substantially greater than the resistivity of the upper and lower conductive layers; and
    a reinforcement layer embedded within the matrix material having greater modulus of elasticity than the matrix material; and
    wherein contact points between the conductive layers of adjacent links provide an electrically conductive path along the length of the belt to impede the build-up of static charge on the belt.

11. The link belt of claim 10 wherein comprising a connector for connecting each link with an adjacent link, wherein the link comprises one of the contact points for a link.

12. The link belt of claim 10 wherein the upper conductive layer and the lower conductive layer comprise sheets of electrically conductive mesh material.

13. The link belt of claim 10 wherein the upper conductive layer and the lower conductive layer comprise non-woven fabric coated with metallic material.

14. A method for producing a link belt, comprising the steps of:
    reinforcing a binding material with a layer of reinforcing material;
    providing a layer of electrically conductive material to form a composite material formed of the binding material, reinforcing material and electrically conductive material;
    curing the composite material to create belt material;
    cutting a plurality of links from the belt material, wherein the stop of cutting comprises cutting an aperture into each link so that the aperture comprises an interior edge exposing a plurality of points of the electrically conductive material;
    connecting the plurality of links to form a series of successive overlapping links, wherein the step of connecting the plurality of links comprises the step of:
    inserting a connector having an exposed electrically conductive surface into an aperture of an adjacent link, such that the connector for a link engages one or more of the electrically conductive points along the interior edge of an aperture of one of the adjacent links.

15. The method of claim 14 wherein the step of providing a layer of conductive material comprises applying a coating of conductive material to the reinforcing material prior to the step of reinforcing the binder.

16. The method of claim 14 wherein the step of providing a layer of conductive material comprises applying a layer of conductive fabric.

17. The method of claim 16 wherein the step of providing a layer of conductive fabric comprises applying a layer of conductive fabric to an outer surface of the reinforced binder.

18. A link belt, comprising:
- a plurality of overlapping interconnected links, wherein each link comprises:
  - a conductive layer;
  - a matrix material having a resistivity that is substantially greater than the resistivity of the conductive layer;
  - a reinforcement layer embedded within the matrix material having greater modulus of elasticity than the matrix material;
  - an aperture through the thickness of the link, wherein the aperture has an internal edge and the conductive layer forms one or more exposed electrically conductive points at the internal edge of the aperture; and
  - a plurality of connectors for connecting the links together, wherein the connectors comprise an exposed electrically connective point along an outer surface, wherein each connector provides an electrically conductive path between a link and one or more of the exposed electrically conductive points at the internal edge of the aperture of an adjacent link.

19. The link belt of claim 18 wherein the exposed electrically connective point is in electrically conductive communication with one or more of the exposed electrically conductive points of the aperture of the adjacent link.

20. The link belt of claim 18 wherein the conductive layer is at an outer surface of the belt link.

21. The link belt of claim 18 wherein the connectors are integrally formed with the links so that each link comprises an integrally formed connector.

22. The link belt of claim 18 wherein the connectors are separable from the links, and wherein the connectors are formed of a metal that is generally non-sparking.

23. A link belt, comprising:
- a plurality of overlapping interconnected links, wherein each link comprises:
  - a connector for connecting the link with an adjacent link;
  - a matrix material having a modulus of elasticity and a conductivity;
    - a reinforcement layer embedded within the matrix material having higher modulus of elasticity than the matrix material; and
    - a conductive layer formed at an outer layer of the matrix material, wherein the conductive layer has a resistivity that is substantially less than the resistivity of the matrix material, and wherein the conductive layer is formed of a sheet of metal fibers comprising a sheet of metallic textile comprising a non-woven non-metal fabric coated with a layer of metallic material.

24. The link belt of claim 23 wherein the conductive layer is between approximately 0.005" and 0.025" thick.

25. The link belt of claim 24 wherein the conductive layer comprises a plurality of conductive contacts points to provide an electrically conductive path along a plurality of points between adjacent links.

26. The link belt of claim 25 wherein the plurality of points create an electrically conductive path along the length of the belt.

27. The link belt of claim 23 wherein the surface resistivity between an outer surface of adjacent belt links is less than approximately 1,000 ohms per square.

28. The link belt of claim 27 wherein the surface resistivity of the upper and lower surfaces of the belts links is less than approximately 10,000 ohms per square.

29. The link belt of claim 23 wherein the connector for a link provides an electrically conductive path between the link and a link to which the connector is connected.

* * * * *